US012605782B2

(12) United States Patent
Larsson-Fritz

(10) Patent No.: US 12,605,782 B2
(45) Date of Patent: Apr. 21, 2026

(54) TOOL AND MANUFACTURING METHOD OF IT

(71) Applicant: SECO TOOLS AB, Fagersta (SE)

(72) Inventor: Stefan Larsson-Fritz, Fagersta (SE)

(73) Assignee: Seco Tools AB, Fagersta (SE)

( * ) Notice: Subject to any disclaimer, the term of this patent is extended or adjusted under 35 U.S.C. 154(b) by 420 days.

(21) Appl. No.: 18/284,571

(22) PCT Filed: Mar. 30, 2022

(86) PCT No.: PCT/EP2022/058424
§ 371 (c)(1),
(2) Date: Sep. 28, 2023

(87) PCT Pub. No.: WO2022/207711
PCT Pub. Date: Oct. 6, 2022

(65) Prior Publication Data
US 2024/0173787 A1    May 30, 2024

(30) Foreign Application Priority Data

Apr. 1, 2021    (EP) ..................................... 21166490

(51) Int. Cl.
B23K 1/19        (2006.01)
B23K 1/012       (2006.01)
(Continued)

(52) U.S. Cl.
CPC ............... B23K 1/19 (2013.01); B23K 1/012 (2013.01); B23K 35/3006 (2013.01);
(Continued)

(58) Field of Classification Search
CPC ........... C22C 5/08; C22C 38/38; C22C 38/22;
C22C 38/02; C22C 38/04; C22C 38/34;
C22C 9/00; C22C 29/08; C21D 1/25;
C21D 1/74; C21D 1/613; C21D 1/773;
C21D 9/22; C21D 6/002; C21D 6/005;
C21D 6/008; B23K 35/3006; B23K
35/0222;
(Continued)

(56) References Cited

U.S. PATENT DOCUMENTS

| | | | | |
|---|---|---|---|---|
| 12,350,752 B2 * | 7/2025 | Ulitzka | ..................... | C21D 9/50 |
| 2023/0330800 A1 * | 10/2023 | Zheng | .................. | B23K 10/027 |

FOREIGN PATENT DOCUMENTS

| | | |
|---|---|---|
| CN | 110091023 A | 8/2019 |
| JP | 2007090371 A | 4/2007 |

OTHER PUBLICATIONS

Jiang Chao et al: "Microstructure and mechanical properties of brazing bonded WC-15Co/35CrMo joint using AgNi/CuZn/AgNi composite interlayers", International Journal of Refractory Metals and Hard Materials, vol. 70, Sep. 7, 2017, pp. 1-8.
(Continued)

*Primary Examiner* — Hadi Shakeri
(74) *Attorney, Agent, or Firm* — Corinne R. Gorski

(57)            ABSTRACT

A tool includes a cemented carbide part and a steel part joined by brazing, where the steel part has an average hardness of between 390 and 510 HV30. The braze joint includes Ti and a TiC layer, with a thickness of between 0.03 and 5 μm, adjoining to the cemented carbide part. The tool provides a strong braze joint and a steel part that have an even hardness.

14 Claims, 3 Drawing Sheets

(51) Int. Cl.

| | |
|---|---|
| *B23K 35/30* | (2006.01) |
| *B23K 101/20* | (2006.01) |
| *B23K 103/00* | (2006.01) |
| *B23K 103/04* | (2006.01) |
| *C21D 1/25* | (2006.01) |
| *C21D 1/613* | (2006.01) |
| *C22C 38/02* | (2006.01) |
| *C22C 38/22* | (2006.01) |
| *C22C 38/38* | (2006.01) |

(52) U.S. Cl.
CPC .............. *B23K 35/302* (2013.01); *C21D 1/25* (2013.01); *C21D 1/613* (2013.01); *C22C 38/02* (2013.01); *C22C 38/22* (2013.01); *C22C 38/38* (2013.01); *B23K 2101/20* (2018.08); *B23K 2103/04* (2018.08); *B23K 2103/50* (2018.08)

(58) Field of Classification Search
CPC ...... B23K 35/302; B23K 1/19; B23K 1/0008; B23K 1/012; B23K 2101/002; B23K 2101/20; B23K 2103/18; B23K 2103/50; B23K 2103/02; B23K 2103/04; B24D 3/00; B22F 7/06; B22F 7/08
USPC .......................................... 81/488
See application file for complete search history.

(56) References Cited

OTHER PUBLICATIONS

Fing et al: "Interface structure and mechanical properties of the brazed joint of Ti C cermet and steel", Journal of the European Ceramic Society, Elsevier Science Publishers, Barking, Essex. GB. vol. 26, No. 7, Jan. 1, 2006, pp. 1287-1292.

* cited by examiner

20 μm

20 μm

1 μm

2 μm

TOOL AND MANUFACTURING METHOD OF IT

RELATED APPLICATION DATA

This application is a § 371 National Stage Application of PCT International Application No. PCT/EP2022/058424 filed Mar. 30, 2022 with priority to EP 21166490.9 filed Apr. 1, 2021.

The present invention relates to a tool comprising a cemented carbide part and a steel part wherein the parts are joined by brazing. The present invention also relates to the making of such tool.

BACKGROUND

Joining steel with cemented carbide by brazing or welding has been known for a long time in the art of making tools. There are several challenges when joining steel with cemented carbide, e.g. differences in CTE (coefficient of thermal expansion), strength of the braze joint, undesired hardness profiles in the steel etc.

There are several solutions that can improve each of these problems individually, but the solutions often result in problems in other areas and not all problems can be solved.

The principle of brazing is that you use a braze material that joins the two pieces when heated. There are several ways to heat the braze joint, where one of the most common ways is induction heating using an induction coil. One of the benefits with using a coil is that only the local area around the braze joint is heated and leaving the rest of the tool unaffected. This local heating can however lead to unwanted hardness profiles in the steel part which can cause problems when the steel part will be provided with threading etc. for fastening rotary tools and other cutting tools etc.

Another disadvantage with the heating using a coil, is that each tool must be handled individually, and a more automatic industrial process would be preferred.

Heating the whole steel and cemented carbide part would make the hardness profile more even but then the increased temperature would affect the whole steel part and thus lead to less hardness overall.

Another problem that can occur when the steel part is provided with threading in order to fasten a cutting tool, is wear. Since the same tool e.g. a shank, is preferably used for a long time, many changes of cutting tool will take place and wear of the threading can affect the fastening of the cutting tool in a negative way.

One object of the present invention is to provide a tool which have both a strong braze joint and a steel part with an even hardness profile and a high hardness and consequently an improved wear resistance.

Another object of the present invention is to provide a process of joining steel and cemented carbide which is easy to use and lead to a predictable joint with high strength and a steel part that has a predictable hardness.

DETAILED DESCRIPTION OF THE PRESENT INVENTION

The present invention relates to a tool comprising a cemented carbide part and a steel part where the steel part has a composition of from 0.63 to 0.70 wt % C, from 1.40 to 1.60 wt % Si, from 1.35 to 1.55 wt % Mn, from 1.00 to 1.20 wt % Cr, from 0.23 to 0.27 wt % Mo less than 0.25 wt % Ni, less than 0.025 wt % P and less than 0.0015 wt % S and the balance Fe. The steel part has an average hardness of between 390 and 510 HV30 with a standard deviation between 0 and 30 HV30. The tool further comprises a braze joint joining said cemented carbide part and said steel part where said braze joint comprises Ti and wherein said braze joint comprises a TiC layer with a thickness of between 0.03 and 5 μm adjoining to the cemented carbide part.

The cemented carbide part can be made of any cemented carbide common in the art. The cemented carbide comprises a hard phase embedded in a metallic binder phase matrix.

By cemented carbide is herein meant that at least 50 wt % of the hard phase is WC.

Suitably, the amount of metallic binder phase is between 3 and 20 wt %, preferably between 4 and 15 wt % of the cemented carbide. Preferably, the main component of the metallic binder phase is selected from one or more of Co, Ni and Fe, more preferably the main component of the metallic binder phase is Co.

By main component is herein meant that no other elements are added to form the binder phase, however, if other components are added, like e.g. Cr, it will inevitably be dissolved in the binder during sintering.

In one embodiment of the present invention, the cemented carbide can also comprise other components common in cemented carbides elements selected from Cr, Ta, Ti, Nb and V present as elements or as carbides, nitrides or carbonitrides.

The steel part according to the present invention preferably contains from 0.63 to 0.70 wt % C, from 1.40 to 1.60 wt % Si, from 1.35 to 1.55 wt % Mn, from 1.00 to 1.20 wt % Cr, from 0.23 to 0.27 wt % Mo less than 0.25 wt % Ni, less than 0.025 wt % P and less than 0.015 wt % S. The balance is Fe.

The average hardness of the steel part is suitably between 390 and 510 HV30, preferably between 420 and 480 HV30. The hardness is measured by a Vickers hardness tester, applying a load of 30 kgf (kilogram force) and a loading time of 15 s. A pattern of 3×3 indents on a cross section of the steel parts was applied. The average value is an average of these measurement points. The standard deviation of the hardness values is suitably between 0 to 30 HV30, preferably between 0 and 15 HV30.

The brazing technique is the so-called active brazing. By that is meant that the joint is not just formed by melting the braze material and forming a metallic bond, it also involves a chemical reaction with one or both of the materials that are to be joined. The reactive element in the braze material is usually Ti, however elements such as Hf, V, Zr and Cr are also considered to be active elements. According to this invention, Ti is the active element.

By braze joint is herein meant the area or mass between the cemented carbide part and the steel part that is filled by the braze material and formed during the brazing process, see below.

The thickness of the braze joint is suitably between 20 and 200 μm, preferably between 30 and 100 μm.

The braze joint is not a homogenous phase. Instead, after brazing, the elements in the braze material form different phases.

The braze joint suitably contains Ti. During brazing Ti will react with the carbon in the cemented carbide part and form a TiC layer at the interface between the braze joint and the cemented carbide part.

There are several ways to detect the presence of a TiC layer depending on which type of equipment that is used.

If a Scanning Electron Microscope (SEM) with a high enough resolution is used, the TiC layer is clearly visible adjacent the cemented carbide part. To confirm that it is a TiC layer EDS or SEM-EPMA with WDS can be used.

If the SEM used does not have enough resolution to show the TiC layer, the accumulation of Ti and/or C at the interface between the braze material and the cemented carbide can be seen using e.g. SEM-EDS or SEM-EPMA with WDS. The accumulation of Ti is herein after called the Ti-accumulation layer and is a good indicator that a TiC layer is formed, even if not visually detected in the SEM image. The Ti-accumulation layer is considerably thicker than the actual TiC-layer which could mean that not all Ti will form TiC. The thickness of the Ti-accumulation layer is also partly affected by the analyze method.

In one embodiment of the present invention, the thickness of the TiC layer is between 0.03 and 5 μm, more preferably between 0.05 and 0.5 μm and most preferred between 0.05 and 0.25 am.

Preferably, the braze joint further comprises one or more elements selected from Zn, Ag, Cu, Sn, In, Zr, Hf, Cr. More preferably from Ag, Cu and In, most preferably from Ag and Cu.

The composition of the braze joint after brazing is difficult to determine since the elements are not evenly distributed. If available, the easiest way is to look at the braze material that has been used since the paste or foil are a homogenous blend. Also, the braze joint might comprise small amounts of elements from the materials to be joined, e.g. Co, Ni, Fe, W etc from the cemented carbide and Fe, Ni etc. from the steel.

The amount of Ti and the other elements in the braze joint could also be measured using Energy-dispersive X-ray spectroscopy analysis (EDS). However, due to the uneven distribution of the elements in the braze joint, many measuring points need to be used and the standard variation will be large. Preferably, the braze joint comprises, in average, Ag in an amount of from 30 to 80 wt %, preferably from 40 to 75 wt %, Cu in an amount of 15 to 65 wt %, preferably from 20 to 40 wt %, In in an amount of 0 to 15 wt % and Ti in an amount of 0.3 to 15 wt %, preferably from 0.5 to 5 wt %.

The braze joint suitably has a shear strength of at least 130 MPa, preferably at least 140 MPa more preferably between 140 and 300 MPa. The shear strength is measured by shear testing.

At the interface between the braze joint and the steel part Ti is also accumulated in the braze joint where it forms a TiC layer. The thickness of this TiC layer at the steel interface is preferably between 1 and 10 μm, preferably between 2 to 5 μm and can be measured by e.g. SEM-EDS.

The tool can be any tool or part of a tool common in the art where a cemented carbide part is joined with a steel part by brazing. Examples are drills, end mills, tool holders like shanks etc.

In one embodiment of the present invention, the tool is a shank used as a tool holder for a cutting tool like an insert, drill head etc. The shank is formed by a cemented carbide part and a steel part, where the cemented carbide part is used to create stability and the steel part is necessary to create threading to fasten a cutting tool.

The present invention also relates to a method of making a tool according to the above comprising the steps of:
  providing a cemented carbide part;
  providing a steel part with a composition of from 0.63 to 0.70 wt % C, from 1.40 to 1.60 wt % Si, from 1.35 to 1.55 wt % Mn, from 1.00 to 1.20 wt % Cr, from 0.23 to 0.27 wt % Mo less than 0.25 wt % Ni, less than 0.025 wt % P and less than 0.0015 wt % S and the balance Fe, placing a braze material comprising Ti in an amount from 0.3 to 15 wt % of the braze material between and in contact with the cemented carbide part and the steel part,
  subjecting the cemented carbide part and the steel part with the braze material in between to a brazing step in a furnace at a temperature between 800 and 1100° C., for a time period of between 5 and 60 minutes and wherein the brazing takes place in an inert atmosphere at a pressure of between 10 to 400 mBar;
  after the brazing, subjecting the cemented carbide part and the steel part with the braze material in between to a quenching step by allowing an inert gas flow into the furnace at a pressure of at least 400 mBar until a temperature of below 200° C. is reached,
  subjecting at least the steel part to a tempering step at a temperature of between 300 and 700° C. for between 15 minutes and 3 hours.

The cemented carbide part and the steel part have a composition as described above. The average hardness of the part, prior to brazing, can differ from that described above depending on steel grade and if the steel has been tempered or not.

The shape and size of the cemented carbide part and the steel part are depending on the type of tool that is to be made.

The braze material (also called filler metal or solder) according to the present invention contains Ti in a total amount of from 0.3 to 15 wt %, preferably 1 to 5 wt % of the braze material. The braze material of the present invention suitably have a solidus temperature of between 488 and 1123° C., preferably between 650 and 850° C. Further, the braze material of the present invention has a liquidus temperature of between 612 and 1180° C., preferably between 750 and 900° C. The braze material further comprises, in addition to Ti, one or more elements selected from Zn, Ag, Cu, Sn, In, Zr, Hf and Cr, preferably from Ag, Cu and In, most preferably Ag and Cu.

In one embodiment of the present invention, the braze material comprises Ag in an amount of from 30 to 80 wt %, preferably from 40 to 75 wt %, Cu in an amount of 15 to 65 wt %, preferably from 20 to 40 wt %, In in an amount of 0 to 15 wt % and Ti in an amount of 0.3 to 15 wt %, preferably from 0.5 to 5 wt %.

In one embodiment of the present invention the braze material comprises from 55 to 75 wt %, Ag, from 20 to 30 wt % Cu, from 0 to 15 wt % In and 1 to 5 wt % Ti, preferably 65 to 75 wt % Ag, 25-30 wt % Cu and 1 to 5 wt % Ti.

Suitably, the braze material is provided as a foil or paste. The braze material is provided onto the joining surfaces of the cemented carbide part and the steel part.

The thickness of the braze material prior to the brazing process depends on the type of material, i.e. foil or paste. If a paste is used, enough material is applied so that the surface that is to be brazed is covered. Typically, the thickness is between 25 and 200 μm, preferably between 50 and 100 μm.

The parts are then placed in a furnace with an inert environment, i.e. with minimum amount of oxygen. Preferably, the brazing temperature in the furnace is between 800 and 1100° C., preferably between 850 and 980° C. The time the parts are subjected to the elevated temperature is between 5 and 60 minutes, preferably between 15 and 45 minutes. If the time at elevated temperature is shorter, there is not enough time for the braze joint to form and the Ti to react to reach the desired strength of braze joint. If the time at elevated temperature is longer, the Ti-containing, brittle reaction zone will grow uncontrolled, which negatively influences the joint properties, e.g. shear strength.

The brazing suitably takes place at low pressure in the presence of an inert gas, preferably Argon. Suitably the pressure is between 10 to 400 mBar, preferably 20 to 200 mBar.

During the brazing in the furnace, a clamping force might be applied to further enhance the brazing. By clamping force is herein meant that the steel part and the cemented carbide part is pressed against each other so that a force is applied, preferably by placing external weights in the carbide part. The force that will act on the braze joint by the weight of the cemented carbide part or steel part, depending on which part that is on top of the other, is not included in these values.

In one embodiment, a clamping force between 0.5 and 10 MPa, preferably between 2 and 8 MPa is applied.

In one embodiment of the present invention, no clamping force is applied.

By quenching is herein meant that the cemented carbide part and the steel part with the braze material in between will, after the brazing step, be cooled down rapidly by allowing an inert gas into the furnace. The inert has can be one of Ar or $N_2$ or a mixture thereof. The temperature should be lowered below the temperature where oxidation occurs. Preferably the temperature in the furnace is lowered to below 200° C., preferably below 150° C., preferably at a rate of at least 30° C./min, more preferably at a rate of at least 45° C./min. After that, free cooling in air can be allowed.

After brazing, the parts are subjected to a tempering step by subjecting the parts to an elevated temperature of between 300 and 700° C., preferably between 400 and 650° C., for a time of between 15 minutes and 3 h hours. Preferably, the tempering takes place in an inert atmosphere, e.g. in Ar and/or $N_2$. The exact time and temperature are dependent on the aimed average hardness level of the steel part.

The brazing furnace used according the present invention can be any furnace that can provide such well controlled conditions with regard to a pressure, heating and cooling rate etc. as has been described above. The brazing and tempering steps can either be done in the same furnace or in two separate furnaces.

It is common that the steel part will be subjected to a machining operation like e.g. threading etc. To be able to machine the steel part, the hardness cannot be too high, and depending on what type of steel grade that is chosen, the tempering step can be done either before or after the machining of the steel part, in order to achieve the desired hardness and wear resistance in the final tool.

In one embodiment of the present invention, the tempering takes place directly after the brazing step and any machining of the steel like e.g. threading, is performed onto the already tempered steel, i.e. after the tempering step.

In another embodiment of the present invention, the tempering takes place after any machining of the steel like e.g. threading etc.

FIGURES

EXAMPLE 1 (INVENTION)

Figure 1:
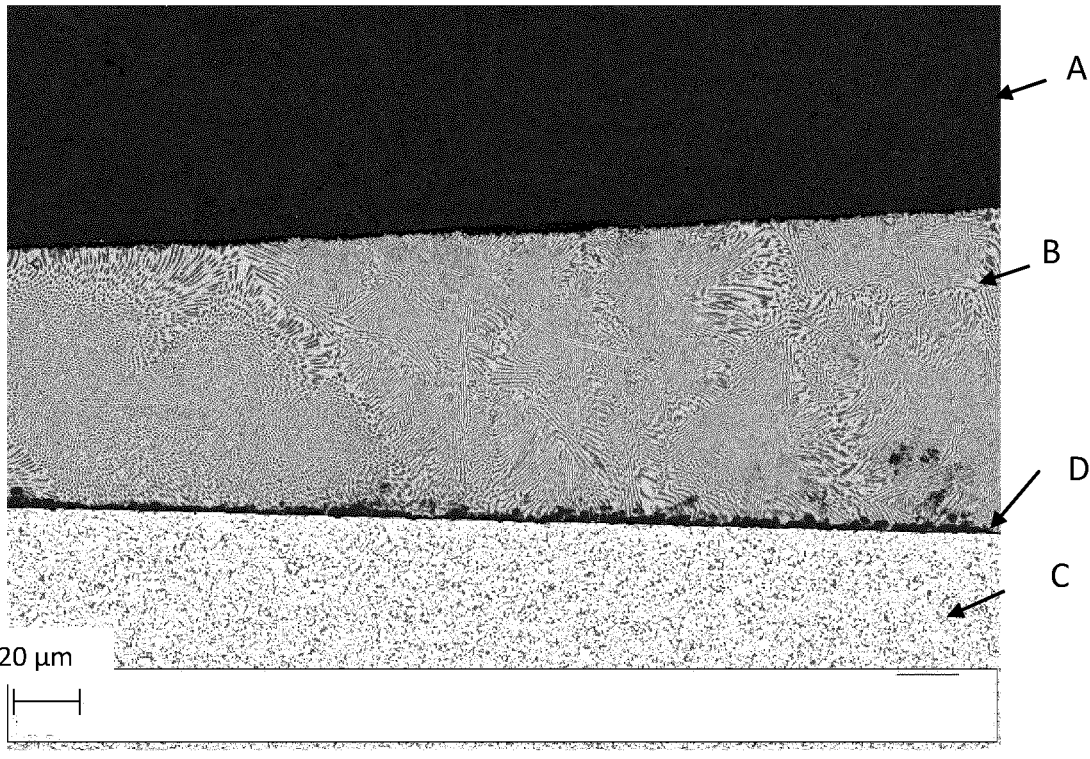
FIG. 1 shows a SEM image of the braze joint according to the invention at a magnification of 1000 where A is the steel part, B is the braze joint, C is the cemented carbide part and D is the TiC layer.

A steel part made of a bearing steel grade Ovako 677 with a composition of 0.63-0.70 wt % C, 1.4-1.6 wt % Si, 1.35-1.55 wt % Mn, 1-1.2 wt % Cr, 0.23-0.27 wt % Mo and the remaining Fe was provided together with a cemented carbide part with a composition of 10 wt % Co and the remaining WC.

The braze material was provided in the form of a paste in an amount enough to cover the surface to be joined. The braze material had a composition of 70 wt % Ag, 28 wt % Cu and 2 wt % Ti.

The paste was placed between the steel part and the cemented carbide part so that both pieces were in contact with the paste. The assembled joined pieces were then placed into a vacuum sintering furnace, PVA COV 231, where a vacuum of $10^{-2}$ mBar was first achieved to remove all oxygen after which an inert atmosphere, Ar at 50 mBar, was introduced, The temperature was first increased to 250° C. which was held for 5 minutes and then a second stop at 550° C. for 5 minutes. The brazing temperature 880° C. was kept for 30 minutes after which the pieces were quenched by flowing Ar gas at a pressure of 600 mBar into the furnace until the temperature was below 150° C.

After the brazing/quenching step, the brazed pieces were subjected to an tempering process to retain the hardness of the steel. The pieces were placed into a furnace where the pieces was heated in an inert atmosphere, 50 mBar Ar, to a temperature 550° C. which was kept for 30 minutes after which the pieces were cooled down.

The sample are herein denoted Invention 1.

EXAMPLE 2 (COMPARATIVE 2)

A steel part made Uddeholm Idun with a composition of 0.21 wt % C, 0.9 wt % Si, 0.45 wt % Mn, 13.5 wt % Cr, 0.2 wt % Mo, 0.6 wt % Ni and 0.25 wt % V and the remaining Fe was provided together with a cemented carbide part with a composition of 10 wt % Co and the remaining WC.

The braze material was provided in the form of a paste in an amount enough to cover the surface to be joined. The braze material had a composition of 70 wt % Ag, 28 wt % Cu and 2 wt % Ti.

The paste was placed between the steel part and the cemented carbide part so that both pieces were in contact with the paste. The assembled joined pieces were then placed into a vacuum sintering furnace, PVA COV 231, where a vacuum of $10^{-2}$ mBar was first achieved to remove all oxygen after which an inert atmosphere, Ar at 50 mBar, was introduced, The temperature was first increased to 250° C. which was held for 5 minutes and then a second stop at 550° C. for 5 minutes. The brazing temperature 880° C. was kept for 30 minutes after which the pieces were quenched by flowing Ar gas at a pressure of 600 mBar into the furnace until the temperature was below 150° C.

After the brazing/quenching step, the brazed pieces were subjected to an tempering process to retain the hardness of the steel. The pieces were placed into a furnace where the pieces was heated in an inert atmosphere, 50 mBar Ar, to a temperature 550° C. which was kept for 30 minutes after which the pieces were cooled down to below 100° C. after which the pieces were once more heated to a temperature 550° C. which was kept for 30 minutes after which the pieces were cooled down. The dual tempering cycle was recommended for this steel type. The sample are herein denoted Comparative 1.

EXAMPLE 3 (COMPARATIVE)

A steel part made of steel 1.6582 (34CrNiMo6) was provided together with a cemented carbide part with a composition of 10 wt % Co and 0.4 wt % Cr and the remaining WC.

The braze material was Ag49Zn23Cu16Mn7.5Ni4.5 in the form of a wire which was applied as a ring with a diameter of 1-2 mm.

Figure 5:
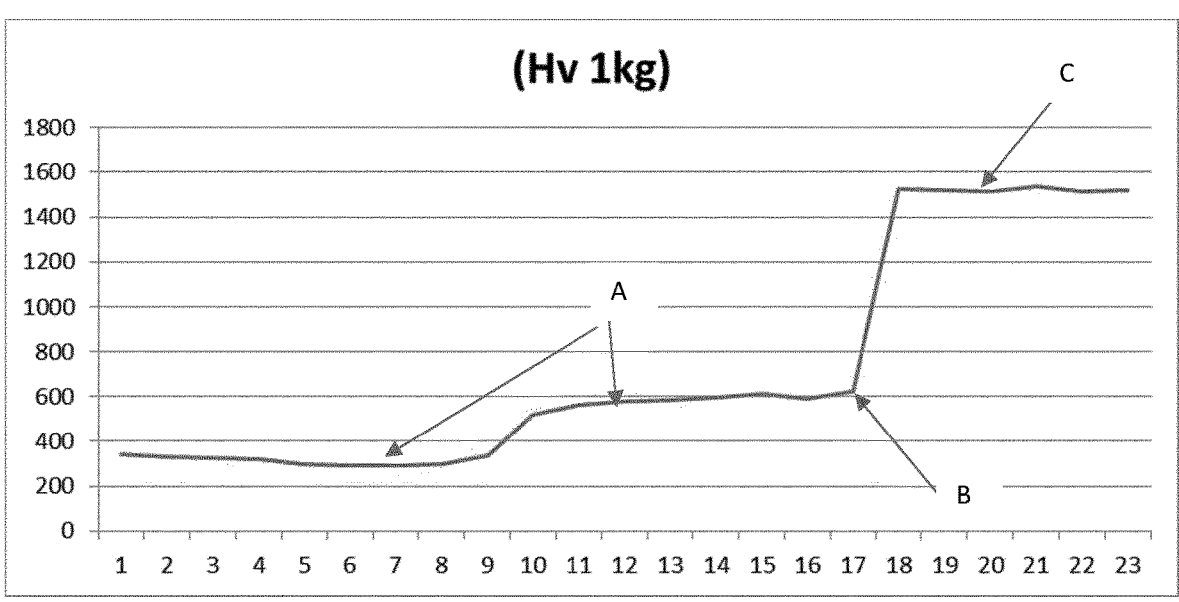
FIG. 5 shows the hardness profile of a tool where induction heating has been used. A is the steel part, B is the braze joint and C is the cemented carbide.
Figure 6:
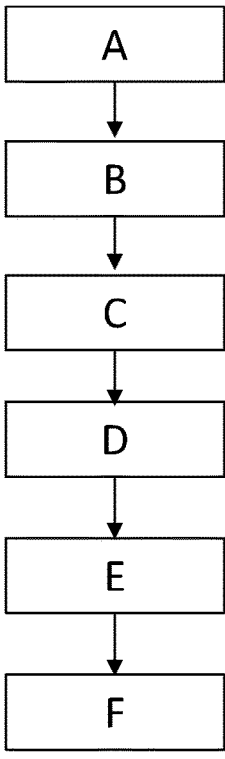
FIG. 6 shows the steps for the claimed method where A is providing a cemented carbide part, B is providing a steel part, C is placing a braze material between the cemented carbide part and the steel part. D is the brazing step, E is the quenching step and F is the tempering step.

The pieces were joined by induction heating using a coil by rapidly heating the braze joint to 700° C. and hold for 15 s, after which the powder is turned off and the tool is allowed to cool to room temperature. In FIG. 5 the hardness values of the steel part are shown where the measuring points is placed along a line from a distance from the braze joint in the steel part and over the braze joint to the cemented carbide part.

The sample are herein denoted Comparative 2.

EXAMPLE 4 (COMPARATIVE)

A steel part made of the carbon-hardening hot-work steel 1.2344 was provided together with a cemented carbide part with a composition of 10 wt % Co, 1 wt % other carbides and the remaining WC.

The braze material was provided in the form of a foil with a thickness of 100 μm. The braze metal had a composition of 100 wt % Cu. The melting temperature is 1085° C.

The foil was placed between the steel part and the cemented carbide part and assembled joining pieces were placed into the furnace where the temperature was first increased to 650° C. at a rate of 20° C./min and hold for 5 minutes. From 650° C. the temperature was then increase by a rate of 10° C./min to the brazing temperature $T_{Brazing}$, which was 1100° C. $T_{Brazing}$ was kept for a dwell time of 15 min, after which the pieces were cooled down to 850° C. with a cooling rate of 50° C./min. From 850° C., the specimens were $N_2$-quenched with an overpressure of 2 bars and a fan frequency of 2500 min$^{-1}$.

Subsequently, the cemented carbide-steel joint with the carbon-hardening hot-work steel 1.2344 was tempered at 630° C. for 2 h two times.

The sample will herein be denoted Comparative 3.

EXAMPLE 5

The hardness was measured using a Vickers hardness tester applying a load of 30 kgf (for HV30) and 1 kgf for (HV1). The load was applied for 15 s.

To analyze the interface between the braze joint and the cemented carbide on Invention 1 and Comparative 2 SEM-EDS technique was used. The SEM used was a Zeiss Sigma VP with an Oxford Instruments NordlysMax$^2$ EBSD-detector and provided with Oxford Instruments X-Max$^N$ EDS-system.

Figure 2:
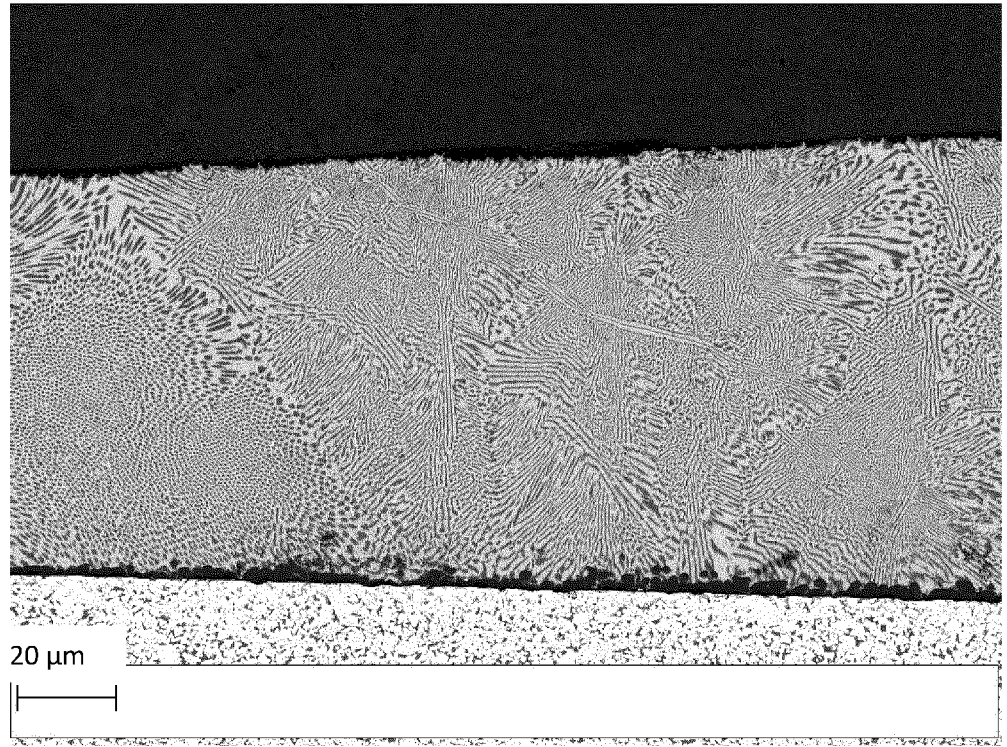
FIG. 2 shows a SEM image of a braze joint according to the invention at a magnification of 1500.

The thickness of the TiC layer in the braze joints of Invention 1 and Comparative 1 was measured on a SEM image at a magnification of 1000. The TiC layer was identified by visual appearance in the back scattered electron mode. In FIGS. 1 and 2, SEM images of Invention 1 is shown where the TiC layer is clearly visible. The values of the thickness of the TiC layer given in Table 1 is an average of 3 measurements, all taken in the middle of the braze joint, i.e. far from the edges.

Figure 3:
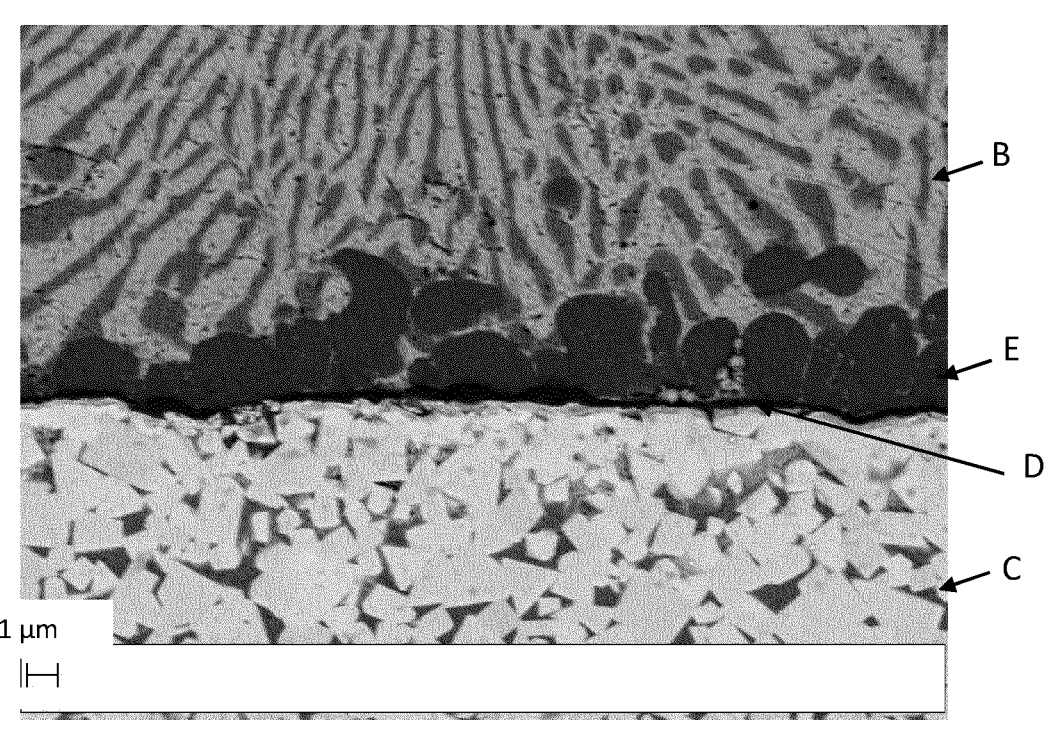
FIG. 3 shows a SEM image of a braze joint according to the invention at a magnification of 10000 where B is the braze joint, C is the cemented carbide part, D is the TiC layer and E is the Ti-accumulation layer.
Figure 4:
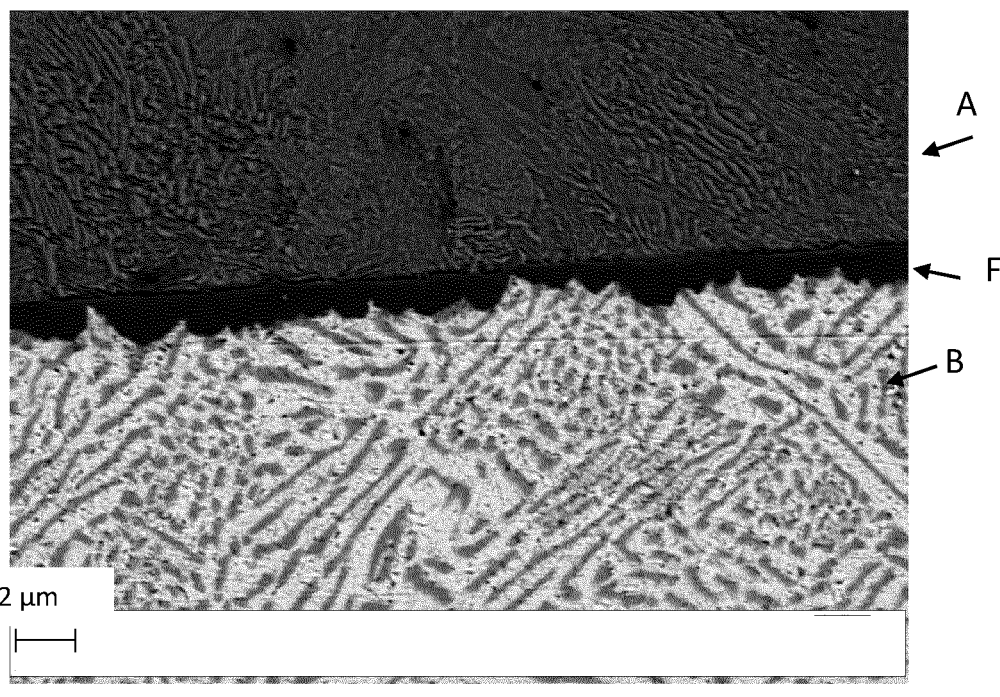
FIG. 4 shows a SEM image of a braze joint according to the invention at the interface between the braze joint and the steel part at a magnification of 10000 where A is the steel part, B is the braze joint and F is the TiC layer at the steel surface.

Using EDS, the accumulation of Ti can be identified in the SEM image and measured as a Ti-accumulation layer. By accumulation layer is herein meant the thickness of the accumulation identified in the SEM image and identified by EDS, see FIG. 3. The values in Table 1 is an estimation from visual inspection of the SEM image and is therefore given as an interval.

TABLE 1

| | Shear strength (MPa) | TiC layer (μm) | Ti-accumulation layer (μm) | Hardness | Standard deviation |
|---|---|---|---|---|---|
| Invention 1 | n.a. | 0.8 | 4-5 | 453 HV30 | 26 |
| Comparative 1 | n.a. | 0.5 | 2 | 317 HV30 | 5 |
| Comparative 2 | N/A | No TiC layer | No Ti acc. layer | 430 HV1 | 141 |
| Comparative 3 | 17.1 | 0* | 0 | 494 HV1 | 5 |

*No Ti in braze material

The invention claimed is:

1. A tool comprising:
   a cemented carbide part;
   a steel part having a composition of from 0.63 to 0.70 wt % C, from 1.40 to 1.60 wt % Si, from 1.35 to 1.55 wt % Mn, from 1.00 to 1.20 wt % Cr, from 0.23 to 0.27 wt % Mo, less than 0.25 wt % Ni, less than 0.025 wt % P, less than 0.0015 wt % S, and the balance Fe, and an average hardness of between 390 and 510 HV30 with a standard deviation between 0 and 30 HV30; and
   a braze joint joining the cemented carbide part and the steel part, wherein the braze joint includes Ti, and wherein the braze joint includes a TiC layer, with a thickness of between 0.03 and 5 μm, adjoining the cemented carbide part.

2. The tool according to claim 1, wherein the steel part has an average hardness of between 420 and 480 HV30 with a standard deviation of between 0 and 15 HV1.

3. The tool according to claim 1, wherein the braze joint has a thickness of between 20 and 200 μm.

4. The tool according to claim 1, wherein the braze joint includes Cu and Ag.

5. The tool according to claim 1, wherein the braze joint includes a composition of Ag in an amount of from 30 to 80 wt %, Cu in an amount of 15 to 65 wt %, In in an amount of 0 to 15 wt % and Ti in an amount of 0.3 to 15 wt %.

6. A method of making a tool according to claim 1 comprising the steps of:
   providing a cemented carbide part;
   providing a steel part having a composition of from 0.63 to 0.70 wt % C, from 1.40 to 1.60 wt % Si, from 1.35 to 1.55 wt % Mn, from 1.00 to 1.20 wt % Cr, from 0.23 to 0.27 wt % Mo, less than 0.25 wt % Ni, less than 0.025 wt % P, less than 0.0015 wt % S and the balance Fe;

subjecting the cemented carbide part and the steel part with the braze material in between to a brazing step in a furnace at a temperature between 80° and 1100° C., for a time period of between 5 and 60 minutes and wherein the brazing takes place in an inert atmosphere at a pressure of between 10 to 400 mBar;

after the brazing, subjecting the cemented carbide part and the steel part with the braze material in between into a quenching step by allowing an inert gas to flow into the furnace at a pressure of at least 400 mBar until a temperature of below 200° C. is reached; and subjecting at least the steel part to a tempering step at a temperature of between 300 and 700° C. for between 15 minutes and 3 hours.

7. The method of making a tool according to claim 6, wherein the brazing step is performed at a temperature between 850 and 980° C., for a time period of between 15 and 45 minutes.

8. The method of making a tool according to claim 6, wherein the inert atmosphere during brazing is Ar and/or $N_2$.

9. The method of making a tool according to claim 6, wherein the temperature during the quenching is lowered at a rate of at least 30° C./minute.

10. The method of making a tool according to claim 6, wherein the inert gas used to flow into the furnace during quenching is one of Ar or $N_2$, or a mixture thereof.

11. The method of making a tool according to claim 6, wherein the tempering step is performed at a temperature of between 400 and 650° C. for between 15 minutes to 3 hours.

12. The method of making a tool according to claim 6, wherein the braze material has a solidus temperature of between 488 and 1123° C. and a liquidus temperature of between 612 and 1180° C. and wherein the braze material, in addition to Ti, further includes one or more elements selected from Zn, Ag, Cu, Sn, In, Zr, Hf and Cr.

13. The method of making a tool according to claim 6, wherein the braze material includes Ag in an amount of from 30 to 80 wt %, Cu in an amount of 15 to 65 wt %, In in an amount of 0 to 15 wt %, and Ti in an amount of 0.3 to 15 wt %.

14. The method of making a tool according to claim 6, wherein a clamping force of between 0.5 to 10 MPa is applied during the brazing step.

* * * * *